(12) United States Patent  
Gisler

(10) Patent No.: US 7,189,831 B2
(45) Date of Patent: Mar. 13, 2007

(54) ORGANIC COMPOUNDS

(75) Inventor: Markus Gisler, Rheinfelden (CH)

(73) Assignee: Clariant Finance (BVI) Limited, Tortola (VG)

( * ) Notice: Subject to any disclaimer, the term of this patent is extended or adjusted under 35 U.S.C. 154(b) by 499 days.

(21) Appl. No.: 10/492,006

(22) PCT Filed: Oct. 7, 2002

(86) PCT No.: PCT/IB02/04100

§ 371 (c)(1),
(2), (4) Date: Apr. 6, 2004

(87) PCT Pub. No.: WO03/031520

PCT Pub. Date: Apr. 17, 2003

(65) Prior Publication Data

US 2004/0249136 A1   Dec. 9, 2004

(30) Foreign Application Priority Data

Oct. 8, 2001   (CH) .............................. 2001185401

(51) Int. Cl.
*C09B 62/513* (2006.01)
*C09D 11/02* (2006.01)
(52) U.S. Cl. .................... 534/637; 8/549; 106/31.48
(58) Field of Classification Search ............... 534/637; 8/549; 106/31.48
See application file for complete search history.

(56) References Cited

U.S. PATENT DOCUMENTS

| 3,669,951 A | 6/1972 | Bien et al. .................. 260/146 |
| 4,065,446 A | 12/1977 | Bien et al. .................. 260/146 |
| 4,996,304 A * | 2/1991 | Tzikas ........................ 534/637 |
| 5,166,325 A * | 11/1992 | Herd et al. .................. 534/637 |
| 5,241,057 A * | 8/1993 | Jager ........................... 534/637 |
| 5,436,324 A | 7/1995 | Reddig et al. .............. 534/625 |

FOREIGN PATENT DOCUMENTS

| CA | 1 229 345 | 11/1987 |
| DE | 28 17 780 | 11/1979 |
| EP | 0 045 278 | 2/1982 |
| EP | 0 065 479 | 11/1982 |
| EP | 0 526 792 | 2/1993 |
| GB | 2 019 867 | 11/1979 |
| JP | 60-130562 | 7/1985 |
| JP | 63-199269 | 8/1988 |
| JP | 2000-44830 | 2/2000 |

OTHER PUBLICATIONS

English abstract for EP 0 045 278.
English abstract for EP 0 065 479.
English abstract for JP 63-199269.
English abstract for JP 2000-044830.
International Search Report for PCT/IB 02/04100.
International Preliminary Examination Report for PCT/IB 02/04100.

* cited by examiner

*Primary Examiner*—Fiona T. Powers
(74) *Attorney, Agent, or Firm*—Tod A. Waldrop

(57) ABSTRACT

Fibre-reactive trisazo compounds of the formula (I)

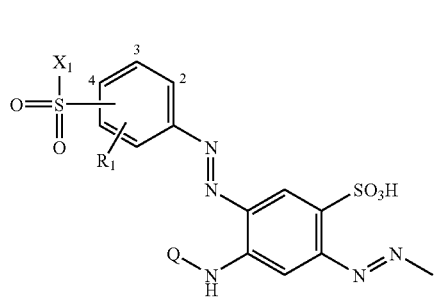

(I)

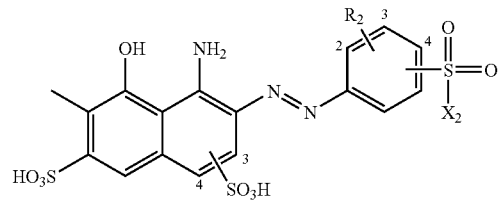

bearing halogenated pyrimidine reactive moieties and where the substituents are each as defined in the claims, and also the associated synthesis, the use of the compounds for dyeing or printing hydroxyl-containing or nitrogenous organic substrates, the use of the compounds as a component in an inkjet printing ink and also the dyed or printed substrates.

15 Claims, No Drawings

ORGANIC COMPOUNDS

This invention relates to novel fibre-reactive trisazo compounds bearing halogenated pyrimidine reactive moieties, and also to the associated synthesis, the use of the compounds for dyeing or printing hydroxyl-containing or nitrogenous organic substrates, the use of the compounds as a component in an inkjet printing ink and also the dyed or printed substrates.

Although reactive radicals of this type have already been disclosed in DE1644204 (U.S. Pat. No. 3,669,951), DE2114158 (U.S. Pat. No. 4,065,446) and EP526792 (U.S. Pat. No. 5,436,324), some of them still have problems in practical application.

Furthermore, reactive dyestuffs containing other reactive groups and various chromophores have already been disclosed in EP-A 45,278 and EP-A 65,479 and in German Offenlegungsschrift 2,817,780. These dyestuffs too still need to be improved.

This invention relates to novel fibre-reactive trisazo dyes of the formula (I)

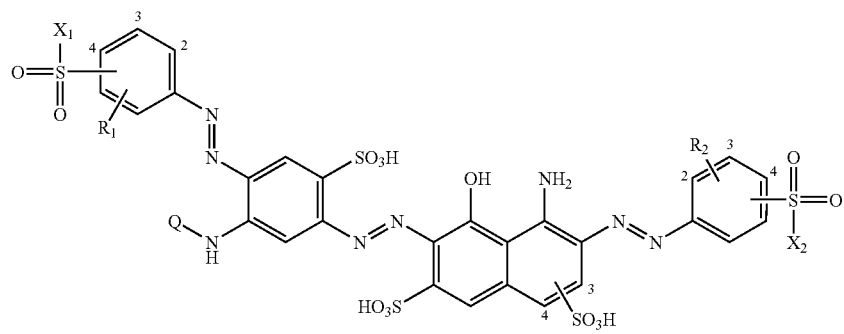

(I)

where
$X_1$ and $X_2$ are independently —CH=CH$_2$, —CH$_2$CH$_2$OH or —CH$_2$CH$_2$Y, where Y is an alkali-detachable group,
$R_1$ and $R_2$ are independently H or —SO$_3$H, and
Q is a halogenated pyrimidine reactive radical, and also their salts and mixtures thereof.

In preferred compounds of the formula (I),
$X_1$ and $X_2$ are each —CH=CH$_2$ or —CH$_2$CH$_2$Y, where each Y is independently —OSO$_3$H, —Cl or —SSO$_3$H, and
Q is one of the following halogenated pyrimidine reactive radicals:

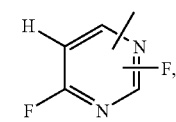 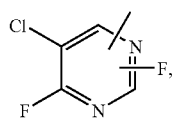

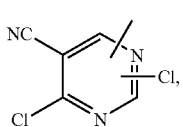 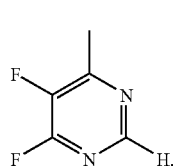

In particularly preferred compounds of the formula (I), $X_1$ and $X_2$ are each —CH=CH$_2$ or —CH$_2$CH$_2$OSO$_3$H, and Q represents the following pyrimidine reactive radicals:

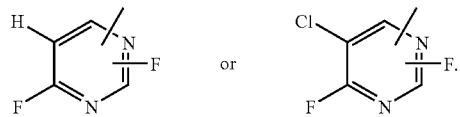

Useful salts include in particular alkali metal or alkaline earth metal salts.

A further aspect of this invention is the synthesis of the compounds of the formula (I) whereby a compound of the formula (II)

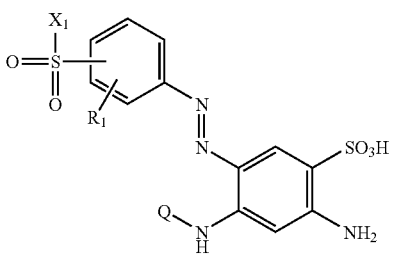

(II)

is diazotized under the generally known conditions and coupled with a compound of the formula (III)

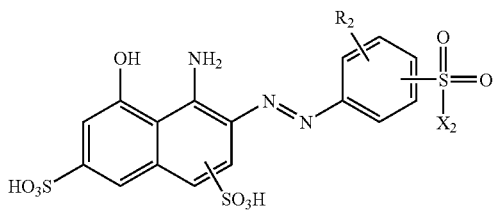

(III)

under known conditions.

The compounds of the formula (I), their salts and mixtures thereof are reactive dyes. They are useful for dyeing or printing hydroxyl-containing or nitrogenous organic substrates and for use in inkjet printing inks for printing paper and optionally pretreated substrates.

Preferred substrates include leather and fibre materials comprising natural or synthetic polyamides or especially natural or regenerated cellulose, such as cotton, filament viscose or staple viscose.

The most preferred substrate is textile material comprising cotton.

The compounds of the formula (I) can be used in dyeing liquors or in print pastes by all dyeing or printing processes customary for reactive dyes. Preference is given to dyeing by the exhaust process, in which case a temperature interval of 30–80° C. and preferably 50–60° C. is employed.

The compounds according to the invention can be used as individual dyes or else, by virtue of their good compatibility, as a combination element with further reactive dyes of the same or other classes that have comparable dyeing properties, for example with regard to general fastnesses, exhaustion value, etc. The combination dyeings obtained are just as fast as the dyeing with individual dye.

The compounds of the formula (I) attain good exhaustion and fixation values. The unfixed dye portion is readily washed off. The dyeings and prints obtained exhibit good wet fastness properties for example with regard to wash, water, seawater and perspiration fastness, and have good stability to oxidative influences such as to chlorinated water, hypochlorite bleach, peroxide bleach and also to perborate-containing laundry detergents.

This invention accordingly further provides a process for dyeing or printing hydroxyl-containing or nitrogenous organic substrates, wherein dyeing or printing is effected with the above-defined compounds, their salts or mixtures thereof.

The present invention yet further provides a hydroxyl-containing or nitrogenous organic substrate which has been dyed or printed as per the above-described dyeing or printing process.

The invention yet further provides substrates, especially cellulose, polyamides and animal fibres, preferably cotton, which have been dyed or printed with such compounds.

The invention similarly provides paper and optionally pretreated substrates comprising cellulose, polyamides or animal fibres, printed with inkjet printing inks comprising such compounds, their salts or mixtures.

The examples which follow illustrate the invention. Parts are by weight and temperatures are reported in degrees Celsius, unless otherwise specified.

EXAMPLE 1

332 parts of a condensation product (formula (IV)) of 2,4-diaminobenzenesulphonic acid and 2,4,6-trifluoropyrimidine are prepared according to EP 526792.

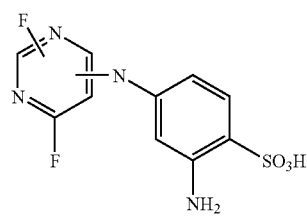

(IV)

281 parts of 4-aminophenyl 2'-sulphatoethyl sulphone are suspended in a mixture of 600 parts of water and 300 parts of ice, admixed with 250 parts of 30% hydrochloric acid and diazotized at 0–5° C. with 250 parts of 4N sodium nitrite solution. This affords about 2 300 parts of a diazo suspension which contains 329 parts of the diazonium salt of the formula (V).

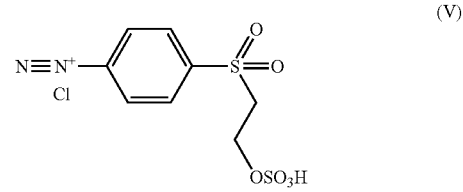

(V)

Meanwhile, 319 parts of 1-amino-8-hydroxynaphthalene-3,6-disulphonic acid (H-acid) are suspended in 1 000 parts of water. The H-acid suspension is added to the diazonium suspension. The subsequent addition of about 750 parts of an approximately 15% sodium carbonate solution raises the pH to 5–6.

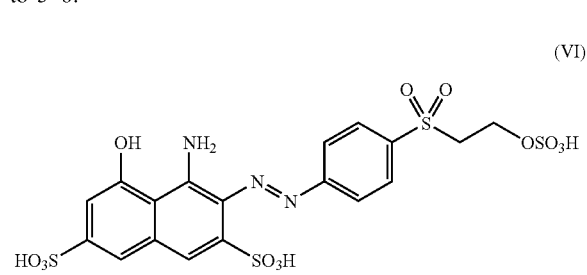

(VI)

A further 281 parts of 4-aminophenyl 2'-sulphatoethyl sulphone are diazotized and added as the diazonium suspension to the reaction mixture of the formula (IV). The simultaneous metered addition of about 750 parts of an approximately 15% sodium carbonate solution maintains the pH at 3–4.

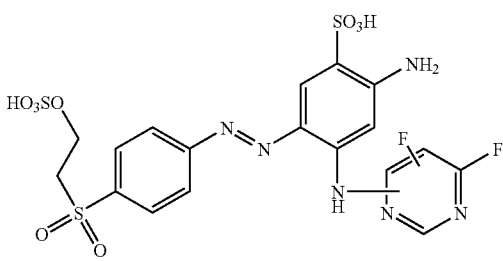

(VII)

The resulting suspension of the monoazo dye of the formula (VII) is admixed with 240 parts of 30% hydrochloric acid, cooled to 0° C. and diazotized with 240 parts of 4N sodium nitrite solution. The diazonium suspension thus prepared is added to the solution of the monoazo dye of the formula (VI). During the diazo addition, the pH of the reaction mixture is maintained between 7–7.5.

The solution is clarified and spray dried to obtain about 2 500 parts of a greenish black salt-containing powder which dyes cellulose in deep bluish green shades. The dye conforms to the following formula (VIII):

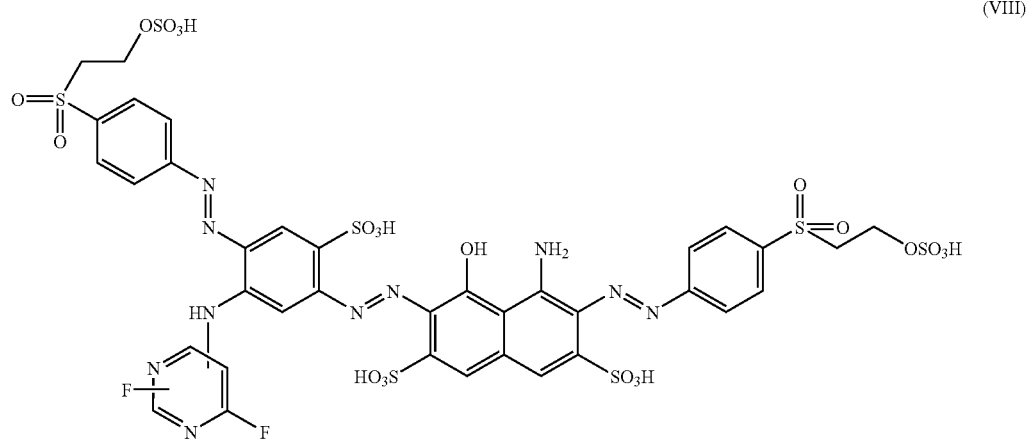

The dyeings possess excellent fastnesses and outstanding unfixed dye wash-off even in deep shades.

EXAMPLE 2

Example 1 is repeated except that the monoazo dye of the formula (VII) is replaced by 694 parts of the monoazo dye of the formula (IX)

The monoazo dye of the formula (IX) is formed by coupling a suspension of the diazonium salt of the formula (XI) (prepared from 361 parts of 2-amino-5-(2'-sulphato-ethyl)sulphonylbenzenesulphonic acid)

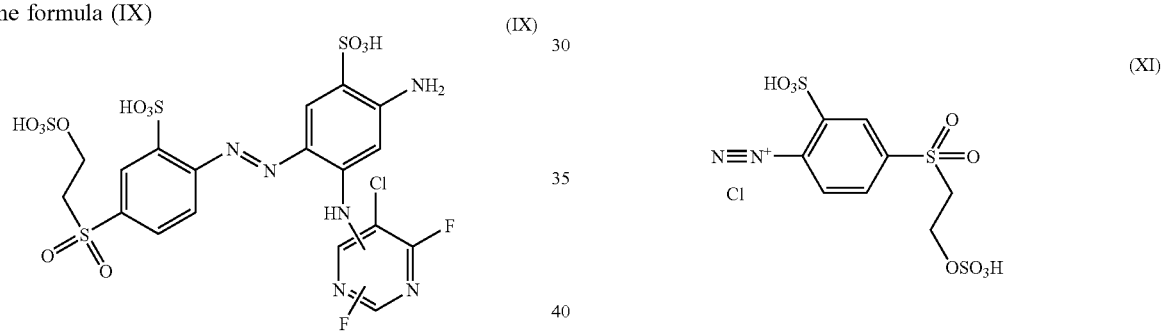

onto 367 parts of a condensation product of the formula (XII)

This affords about 2 600 parts of a greenish black salt-containing powder which dyes cellulose in deep bluish green shades. The dye conforms to the formula (X)

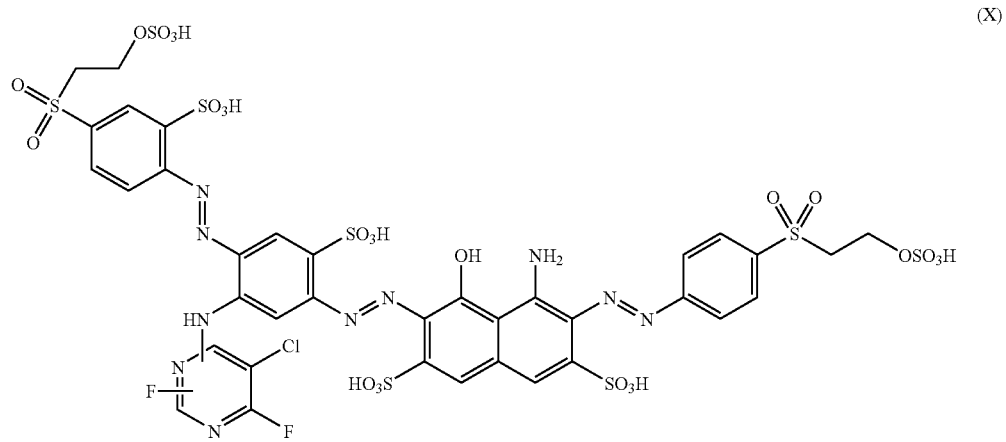

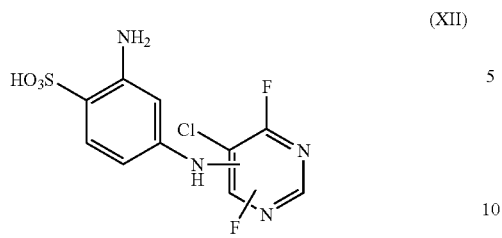

(XII)

formed from 2,4-diaminobenzenesulphonic acid and 5-chloro-2,4,6-trifluoropyrimidine.

The remaining Examples 3–15 can be synthesized similarly to Examples 1 and 2.

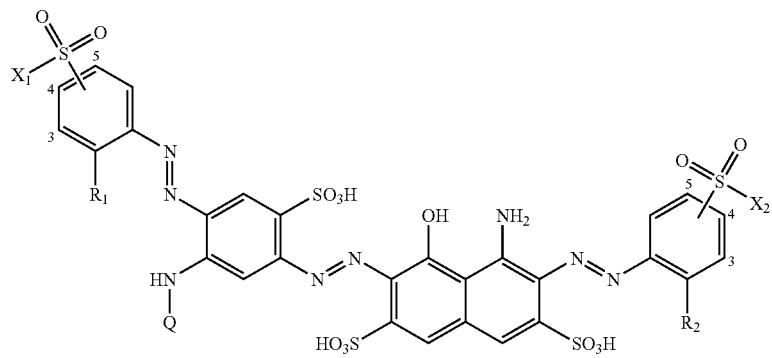

TABLE

| Ex. | $X_1$ | Position of $SO_2X_1$ | $R_1$ | Q | $R_2$ | $X_2$ | Position of $SO_2X_2$ |
|---|---|---|---|---|---|---|---|
| 3 | —CH$_2$CH$_2$OSO$_3$H | 4 | H | NC, Cl, Cl (pyrimidine) | H | —CH$_2$CH$_2$OSO$_3$H | 4 |
| 4 | —CH=CH$_2$ | 4 | SO$_3$H | H, F, F (pyrimidine) | H | —CH$_2$CH$_2$OSO$_3$H | 4 |
| 5 | —CH$_2$CH$_2$OSO$_3$H | 4 | SO$_3$H | " | H | —CH$_2$CH$_2$OSO$_3$H | 3 |
| 6 | —CH=CH$_2$ | 4 | SO$_3$H | " | H | —CH$_2$CH$_2$OSO$_3$H | 3 |
| 7 | —CH$_2$CH$_2$OSO$_3$H | 4 | H | Cl, F, F (pyrimidine) | H | —CH$_2$CH$_2$OSO$_3$H | 4 |
| 8 | —CH$_2$CH$_2$OSO$_3$H | 4 | SO$_3$H | NC, Cl, Cl (pyrimidine) | H | —CH$_2$CH$_2$OSO$_3$H | 4 |
| 9 | —CH=CH$_2$ | 4 | SO$_3$H | H, F, F (pyrimidine) | SO$_3$H | —CH$_2$CH$_2$OSO$_3$H | 4 |

TABLE-continued

| Ex. | $X_1$ | Position of $SO_2X_1$ | $R_1$ | Q | $R_2$ | $X_2$ | Position of $SO_2X_2$ |
|---|---|---|---|---|---|---|---|
| 10 | —CH$_2$CH$_2$OSO$_3$H | 4 | SO$_3$H | " | SO$_3$H | —CH$_2$CH$_2$OSO$_3$H | 4 |
| 11 | —CH$_2$CH$_2$OSO$_3$H | 5 | SO$_3$H | " | H | —CH$_2$CH$_2$OSO$_3$H | 4 |
| 12 | —CH$_2$CH$_2$OSO$_3$H | 5 | SO$_3$H | " | H | —CH$_2$CH$_2$OSO$_3$H | 3 |
| 13 | —CH=CH$_2$ | 5 | SO$_3$H | (structure) | H | —CH$_2$CH$_2$OSO$_3$H | 4 |
| 14 | —CH$_2$CH$_2$OSO$_3$H | 4 | H | " | H | —CH$_2$CH$_2$OSO$_3$H | 4 |
| 15 | —CH$_2$CH$_2$OSO$_3$H | 4 | SO$_3$H | " | H | —CH$_2$CH$_2$OSO$_3$H | 4 |

Use Prescription A

A dyebath containing 0.3 part of the dye of Example 1 and 15 parts of Glauber salt (calcined) in 300 parts of demineralized water is entered with 10 parts of cotton fabric (bleached) at 60° C. After 30 minutes at 60° C., a total of 6 parts of sodium carbonate (calcined) are added at intervals of 10 minutes in portions of 0.2, 0.6, 1.2 and lastly 4 parts while the temperature is maintained at 60° C. Dyeing is then continued at 60° C. for one hour. The dyed material is subsequently rinsed in running cold water and then for 3 minutes in running hot water. The dyeing is washed off at the boil in 500 parts of demineralized water in the presence of 0.25 part of Marseilles soap for 15 minutes. After rinsing in running water (3 minutes hot) the fabric is centrifuged and dried in a drying cabinet at about 70° C. This provides a green cotton dyeing having good fastnesses, which exhibits good light and wet fastnesses in particular and is stable to oxidative influences.

Use Prescription B

A dyebath containing 10 parts of Glauber salt (calcined) in 300 parts of demineralized water is entered with 10 parts of cotton material (bleached). The bath is heated to 60° C. in the course of 10 minutes before 0.5 part of the dye of Example 1 is added. Following a further 30 minutes at 40° C., 3 parts of sodium carbonate (calcined) are added before dyeing is continued at 60° C. for a further 45 minutes. The dyed material is rinsed with running cold water and then with hot water and washed off at the boil similarly to prescription A. Rinsing and drying leaves a green cotton dyeing which has the properties recited for prescription A.

The dyes of Example 2–15 or dye mixtures of Examples 1–15 can likewise be used for dyeing similarly to prescriptions A and B. The dyeings obtained possess good fastness properties.

Use Prescription C

| A print paste composed of |
|---|
| 40 parts of the dye of Example 1 |
| 100 parts of urea |
| 350 parts of water |
| 500 parts of 4% sodium alginate thickening |
| 10 parts of sodium bicarbonate |
| 1000 parts in total | is applied to cotton material by the customary printing processes.

The printed material is steamed at 102–104° C. for 4–8 minutes and then rinsed cold and hot. The fixed cotton material is subsequently washed off at the boil (similarly to prescription A) and dried. The bluish green print obtained exhibits good general fastnesses.

Examples 2–15 or dye mixtures of Examples 1–15 can likewise be used for printing cotton similarly to prescription C. Bluish green prints having good fastness properties are obtained in all cases.

Use Prescription D 2.5 parts of the dye of Example 1 are dissolved in a mixture of 20 parts of diethylene glycol and 77.5 parts of water at 25° C. with stirring. This solution can be used directly as a printing ink for printing by means of inkjet printing apparatus. The substances of Examples 2–15 or dye mixtures which contain materials of Examples 1–15 can likewise be used similarly to prescription D.

The invention claimed is:

1. A compound of the formula (I)

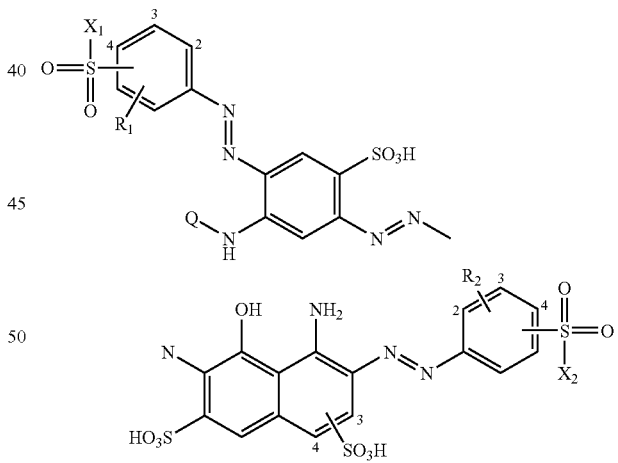

where
X$_1$ and X$_2$ are independently —CH=CH$_2$, —CH$_2$CH$_2$OH or —CH$_2$CH$_2$Y, where Y is an alkali-detachable group,
R$_1$ and R$_2$ are independently H or —SO$_3$H, and
Q is a halogenated pyrimidine reactive radical,
or a salt or mixture thereof.

2. A compound according to claim 1, wherein
X$_1$ and X$_2$ are each —CH=CH$_2$ or —CH$_2$CH$_2$Y, where each Y is independently —OSO$_3$H, —Cl or —SSO$_3$H, and Q is one of the following halogenated pyrimidine reactive radicals:

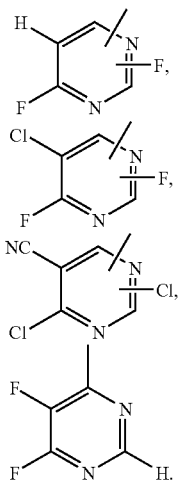

3. A compound according to claim 1, wherein
$X_1$ and $X_2$ are each —CH=CH$_2$ or —CH$_2$CH$_2$OSO$_3$H, and
Q represents the following pyrimidine reactive radicals:

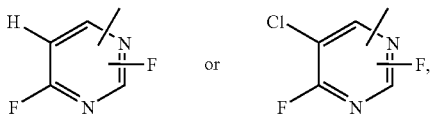

4. A process for preparing a compound of claim 1, comprising the steps of diazotizing a compound of the formula (II)

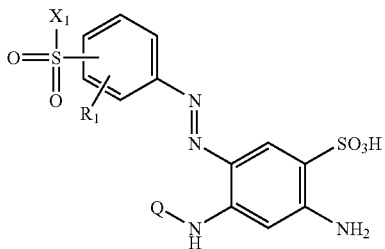

where the individual substituents are each as defined in claim 1, and coupling the diazotized compound with a compound of the formula (III)

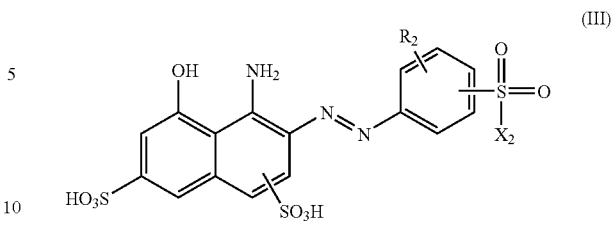

where the individual substituents are each as defined in claim 1.

5. A reactive dye for dyeing or printing a hydroxyl-containing or nitrogenous organic substrate comprising a compound selected from the group consisting of one or more compounds according to claim 1, a salt of a compound according to claim 1 and mixtures thereof.

6. The reactive dye according to claim 5 wherein the substrate is selected from the group consisting of leather and fibre materials, wherein the fibre materials include natural or synthetic polyamides or natural or regenerated cellulose.

7. The reactive dye according to claim 5, wherein the substrate is cotton.

8. An inkjet printing ink comprising a compound selected from the group consisting of one or more compounds according to claim 1, a salt of a compound according to claim 1 and mixtures thereof.

9. A dyed or Printed substrate dyed or printed with a compound selected from the group consisting of one or more compounds according to claim 1, a salt of a compound according to claim 1 and mixtures thereof.

10. A substrate printed with inkjet printing ink, wherein the inkjet printing ink includes a compound selected from the group consisting of one or more compounds according to claim 1, a salt of a compound according to claim 1 and mixtures thereof.

11. The reactive dye according to claim 6, wherein the natural regenerated cellulose is filament viscose or staple viscose.

12. The dyed or printed substrate according to claim 9, wherein the substrate is selected from the group consisting of cellulose, polyamides, and animal fibers.

13. The substrate according to claim 10, wherein the substrate is selected from the group consisting of cellulose, polyamide and animal fibers.

14. A salt of a compound according to claim 1.

15. A mixture of two or more compounds according to claim 1, or their salts.

* * * * *